United States Patent [19]

Masumura

[11] Patent Number: 5,641,127
[45] Date of Patent: Jun. 24, 1997

[54] APPARATUS FOR LIQUIDIZING ORGANIC SUBSTANCES

[75] Inventor: Kimitoshi Masumura, Kure, Japan

[73] Assignee: Cosmo Enterprise Co., Ltd., Hiroshima-ken, Japan

[21] Appl. No.: 379,605

[22] PCT Filed: Jun. 18, 1993

[86] PCT No.: PCT/JP93/00825

§ 371 Date: Dec. 15, 1994

§ 102(e) Date: Dec. 15, 1994

[87] PCT Pub. No.: WO94/00404

PCT Pub. Date: Jan. 6, 1994

[30] Foreign Application Priority Data

Jun. 24, 1992 [JP] Japan ........................ 4-208366

[51] Int. Cl.⁶ ............................................ B02C 19/00
[52] U.S. Cl. ....................... 241/17; 241/21; 241/23; 241/57; 241/46.013; 241/46.17; 241/65
[58] Field of Search ................... 241/199.12, 23, 241/65, 46.013, 46.017, 46.08, 46.11, 46.17, 17, 57, 21

[56] References Cited

U.S. PATENT DOCUMENTS 4,288,254  9/1981  Gladu .................... 241/46.017 X

FOREIGN PATENT DOCUMENTS

| 206376 | 12/1956 | Australia | .................. 241/199.12 |
| 104273 | 2/1951 | Japan . | |
| 42678 | 9/1987 | Japan . | |
| 166504 | 10/1988 | Japan . | |
| 125942 | 10/1990 | Japan . | |
| 872 | 1/1993 | Japan . | |

*Primary Examiner*—Mark Rosenbaum
*Attorney, Agent, or Firm*—Jordan and Hamburg

[57] ABSTRACT

Organic wastes such as raw refuses discharged from general households are easily liquefied at every home so as to decrease the amounts of refuses and to be able to utilize these refuses as liquefied fertilizer and the like. With these purposes, an inner vessel, in the bottom of which through-holes of the desirable shape are formed, is housed in a bottomed outer vessel in such a manner that the bottom of the inner vessel is spaced apart from the bottom of the outer vessel, a quefied matter take-out valve Is provided on the outer surface of the outer vessel, and raw refuses are placed in the inner vessel, and liquefield, so that solid matters are reduced in amount and the substance is taken out as liquefied fertilizer and the like for use.

30 Claims, 9 Drawing Sheets

APPARATUS FOR LIQUIDIZING ORGANIC SUBSTANCES

DESCRIPTION

1. Technical Field

The present invention relates to an apparatus for liquidizing organic substances that is capable of, at each household, easily liquidizing-processing organic waste, such as kitchen refuse, discharged from a usual household in a short time while preventing generation of an offensive odor so as to reduce the quantity of the waste, and as well as enabling the thus-liquidized substances to be easily separated and taken out so that the liquidized substances are used mainly as liquid fertilizer or the like.

2. Background Art

Under present conditions, kitchen refuse discharged from usual households, garbage generated in restaurants or fields relating to food and excrement of animals in the livestock industry or the like have been thrown away without any utilization of the same. The amount of generation of such organic waste has been increased every year, and therefore loads for the waste disposal plants become heavier. In particular, a new waste disposal plant cannot substantially be founded in urban regions, thus causing a critical social problem to arise. From another viewpoint of the resource recycle, the disposal of the foregoing organic waste without recycling results in an extravagance of the limited source.

Accordingly, a waste disposal container of a type capable of, at each household, composting kitchen refuse discharged from a usual household has been developed. However, such waste disposal container takes a long time to compost the kitchen refuse and, therefore, a large-size waste disposal container is required to dispose the kitchen refuse discharged from a household. Furthermore, bad smelling inhibits use of the waste disposal container of the foregoing type in residential areas in urban regions.

In order to raise the disposing speed, a method has been found which comprises the steps of adding water and microorganisms to the kitchen refuse in small quantities required, forcibly decomposing (fermenting and digesting) the kitchen refuse to liquidize the kitchen refuse and to mature the same so that the matured substances are used as liquid fertilizer or the like. The method enables substantially all kinds of kitchen refuse to be liquidized in a short time. Furthermore, split-sampling of the liquidized substances as liquid fertilizer or the like results in that the quantity of residual solid materials can be reduced considerably. While paying attention to the foregoing fact, the applicant of the present invention has developed and applied for patent a method that uses microorganisms to produce liquid fertilizer from kitchen refuse (refer to Japanese Patent Laid-Open No. 5-872).

Although the foregoing process can be completed by using a plastic bucket for usual households, use of the simple bucket involves a difficulty in separating the residual solid materials and the liquidized portion after the liquefaction process has been completed. In addition, the liquidized portion cannot easily be maintained at a suitable liquidized (decomposed, fermented and digested) condition under which the same is used as the liquid fertilizer or the like. In order to raise the liquidizing speed, it is effective to grind, stir and aerate the kitchen refuse and to heat the same to a certain temperature (at which microorganisms grow easily and functions of enzymes of the microorganisms are facilitated). Since the foregoing disclosure has been structured on an assumption that the usual plastic bucket is used, a satisfactory liquidizing apparatus has not been obtained. Therefore, the foregoing disclosure cannot easily satisfy a variety of liquidizing conditions, and thus use of the same at usual households has encountered a problem.

That is, a liquidizing apparatus for use in usual households for liquidizing organic substances, such as kitchen refuse, must meet the following requirements:

(1) Residual solid materials and the liquidized portion can easily be separated from each other;

(2) A function, with which the liquidized portion can easily be taken in a state where the same can be used as liquid fertilizer or the like, is required;

(3) The overall apparatus body must be hermetically sealed up in principle so that leakage of bad smell is prevented;

(4) The internal chamber cannot be brought to an anaerobic state even if the inner chamber is placed in the liquid so that generation of bad smell is prevented;

(5) The liquid diffused into the outer chamber can be reversely penetrated into the internal chamber so that the microorganisms in the liquid are efficiently be used; and (6) The apparatus can be used continuously and repeatedly.

In principle, no operation is required except the operation of injecting the kitchen refuse.

If the foregoing requirements are satisfied, kitchen refuse can be liquidizing-processed in a short time, and generation of bad smell can be prevented. Thus, an apparatus of the foregoing type can be used in a usual household.

Arts related to the present invention will now be described. As disclosed in Japanese Patent Publication No. 62-42678 and U.S. Pat. No. 3,864,249, methods of fermenting animal waste have been developed. Although the fermenting method including fermenting conditions has been considered in the foregoing disclosures, the disclosed structures have not been assumed to be used in usual households, and therefore no specific processing apparatus has been described.

An apparatus for disposing kitchen refuse has been disclosed in Japanese Utility Model Laid-Open No. 63-166504, the apparatus having a structure comprising an inner container having through holes in the side plates thereof and an outer container to which a liquid outlet faucet is attached. Although the foregoing apparatus satisfies the requirements (1) and (2), it does not satisfy the requirements (3) to (6). That is, since the through holes are formed in the side plates of the inner container, the water level in the inner container and that in the outer container are made same. Furthermore, the structure, such that the apparatus is not hermetically sealed up and no forcible ventilating apparatus with respect to the inner container is provided, causes the portion of the inner container, that is immersed in the liquid, to be brought to the anaerobic state. As a result, bad smell is generated. Since the overall apparatus body is not sealed up, the bad smell reaches the outside of the apparatus. Therefore, the apparatus cannot be used in the interior portion of usual households. Therefore, the anaerobic state must be prevented by always discharging liquid through the liquid outlet faucet so as to prevent the inner container from being immersed in the liquid so as to prevent the anaerobic state. However, the continuous discharge of the liquid for the purpose of preventing accumulation of the liquid involves inconvenience in using the liquidized materials as the fertilizer because the liquid cannot be accumulated in a required quantity. Furthermore, the microorganisms in the liquid are undesirable abandoned without sufficiently use of the microorganisms to dispose the kitchen refuse. Thus, a long time is required to dispose the kitchen refuse. Since the foregoing apparatus is structured on the assumption that it is used such that the inner container, into which kitchen refuse is injected, is not immersed in the liquid, the microorganisms and the like must be, inconveniently, injected at each use.

That is, the organism liquidizing process in a usual household must satisfy the foregoing requirements (1) to (6). Therefore, an idea that is different from the concept for composting kitchen refuse or organic substances is required. Thus, it can be understood that the conventional kitchen refuse disposal apparatuses cannot be applied. The conventional kitchen refuse disposal apparatuses have not been structured on the basis of the idea of processing kitchen refuse by using aerobic bacteria contained in liquid. Hitherto, the anaerobic state has been prevented by causing the kitchen refuse to be in contact with the outside air.

DISCLOSURE OF THE INVENTION

Accordingly, an apparatus for liquidizing organic substances according to the present invention comprises an outer chamber having a bottom, wherein the outer chamber accommodates an inner chamber having through holes formed into a desired shape in a bottom portion thereof in such a manner that the bottom of the inner chamber maintains a distance from the bottom of the outer chamber, a liquidized-substance outlet valve is disposed on the side surface of the outer chamber at a position higher than the through holes, a cover for the inner chamber and cover for the outer chamber respectively cover the inner chamber and the outer chamber, and an air supply pipe connected to a ventilating unit is disposed in the inner chamber.

A liquidizing (fermenting, decomposing and digesting) chamber and maturing chamber are disposed adjacently through a filtering member, a liquidized-substance outlet valve is provided for the maturing chamber, direct exposure of the liquidizing chamber to outer air is inhibited, and an air supply unit is provided for the liquidizing chamber.

The by-products, such as kitchen refuse, or livestock excretions are injected into the inner chamber or the liquidizing chamber of the liquidizing apparatus according to the present invention, microorganisms (aerobic or facultative aerobic bacteria) or enzymes (originated from microorganisms) are added as required, and water in an adequate quantity is added before aeration is performed so that the kitchen refuse or the like quickly start liquefaction (fermentation, decomposition and digestion). As the time passes, a major portion of the kitchen refuse (by-products of foods) is liquidized and shifted to the outer chamber so as to be matured. Thus, the kitchen refuse is converted into liquid fertilizer or the like in the form that can be used most adequately in the ecological system of the earth.

If stirring, heating and the like are performed if necessary, the liquidizing speed can be raised so that the liquefaction (efficiency) is enhanced.

BEST MODE FOR CARRYING OUT THE INVENTION

Figure 1:
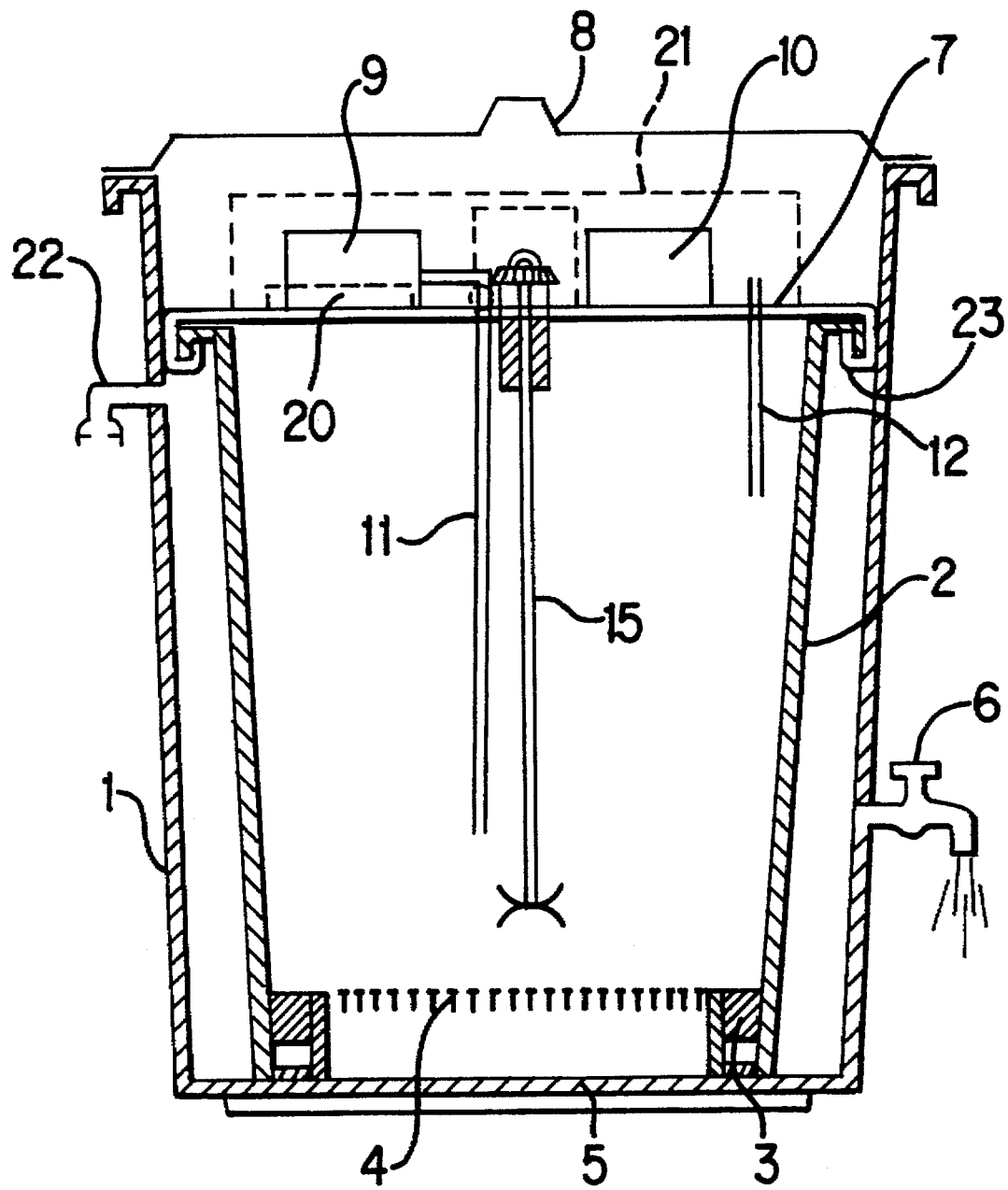
FIG. 1 is a cross sectional view which illustrates an apparatus for liquidizing organic substances in which a cylindrical inner chamber is accommodated in a cylindrical outer chamber.

Embodiments of an apparatus for liquidizing organic substances according to the present invention will now be described with reference to the drawings.

A first embodiment includes an arrangement in which an inner chamber and an outer chamber are constituted by plastic-bucket-like cylindrical members.

The first embodiment will now be described with reference to FIGS. 1 to 3.

Reference numeral 1 represents an outer chamber which has a bottom, and the inner and outer surfaces have a ceramic coating. As the outer chamber 1, for example, a plastic bucket may be employed. Reference numeral 2 represents an inner chamber having a bottom portion provided with four leg portions 3. Furthermore, a filtering member 4 having mesh-like through holes is disposed on the leg portions 3. As the inner chamber 2, for example, a plastic flowerpot may be used. In the outer chamber 1, the inner chamber 2 is accommodated. The inner chamber 2 is in contact with a bottom 5 of the outer chamber 1 at the leg portions 3 while forming a gap between the filtering member 4 and the bottom 5 of the outer chamber 1. Therefore, the bottom surface of the inner chamber 2 is communicated with the outer chamber 1. As described later, the inner chamber 2 serves as a liquidizing (fermenting decomposing and digesting) chamber, while the space between the inner chamber 2 and the outer chamber 1 serves as a maturing chamber.

Reference numeral 6 represents a liquidized-substance outlet valve disposed on the side surface of the outer chamber 1. The liquidized-substance outlet valve 6 is positioned higher than the filtering member 4 to cause liquid to be also always left in the inner chamber 2. Reference numeral 7 represents a cover for the inner chamber 2, and 8 represents a cover for the outer chamber 1. The covers 7 and 8 are structured to be capable of hermetically sealing the inner chamber 2 and the outer chamber 1. A heater 9 and an air supply fan 10 are disposed on the top surface of the cover 7 for the inner chamber 2. Thus, air heated by the heater 9 is, by the air supply fan 10, passed through an air supply pipe 11, and then such air is introduced into the inner chamber 2. Reference numeral 12 represents an air ventilating pipe for discharging air introduced into the inner chamber 2, the air ventilating pipe 12 establishes communication between the inner portion of the inner chamber 2 and that of the outer chamber 1. A portion of the cover 7 for the inner chamber 2 is formed into an injection port 13 which can be partially opened/closed. Reference numeral 14 represents a thermostat for controlling the temperature in the inner chamber 2.

Reference numeral 15 represents a shaft having a grinding blade 16 at the leading portion thereof and rotatively supported by a bearing 17. The shaft 15 is rotated by a motor 18 through a gear 19. The operating time and the number of rotations of the motor 18 are controlled by a program timer 20. In order to make watertight the foregoing units, the units are covered with a packing 21.

Reference numeral 22 represents an overflowing pipe also serving as an air remover that is disposed at a relatively high position on the side surface of the outer chamber 1. The cover 7 for the inner chamber 2 has a connection portion 23 which causes the peripheral portion of the cover 7 to be connected to the top surface of the inner chamber 2 in order to establish a sealing state between the cover 7 for the inner chamber 2 and the inner chamber 2. The inner and outer surfaces of the cover 8 for the outer chamber 1 are provided with a ceramic coating.

Example of Use of the First Embodiment

Initially, water in an adequate quantity (for example, 40% of the capacity of the inner chamber 2) is injected into the inner chamber 2, and adequate microorganisms (for example, aerobic bacteria), enzymes and the like are added. The quantities of the microorganisms and enzymes to be added are different depending upon the types of the microorganisms and the size of the inner chamber 2 (the same are adjusted adequately).

If kitchen refuse or the like has been generated in a household or the like, the cover 8 for the outer chamber 1 is opened, and the injection port 13 of the cover 7 for the inner chamber 2 is opened. Then, the kitchen refuse or the like is deposited into the inner chamber 2, and then the injection port 13 of the cover 7 is closed. Also the cover 8 for the outer chamber 1 is closed.

After the kitchen refuse or the like has been deposited into the inner chamber 2, the motor 18 is rotated to rotate the grinding blade 16 so that the kitchen refuse or the like is ground and stirred.

On the other hand, the temperature in the inner chamber is adjusted so that temperatures (25° C. to 35° C. if the microorganism are bacteria or temperatures suitable for enzymes to function) suitable for microorganisms to grow are maintained. The temperature adjustment is performed in such a manner that the temperature of air introduced by the air supply fan 10 through the air supply pipe 11 is adjusted by the heater 9.

The stirring operation by using the grinding blade 16 and the supply of air through the air supply pipe 11 enhance the liquefaction (fermentation, decomposition and digestion). Thus, the kitchen refuse is formed into a liquid and soluble substances that are then dissolved in water. The solute (the kitchen refuse component and the like) dissolved in water is, due to the principle of diffusion, diffused from the inner chamber 2 into the solution in the outer chamber 1 through the filtering member 4. In the outer chamber 1, the solute is matured into a form that can be used again, such as liquid fertilizer. Furthermore, phase interchange that causes the diffused liquid to pass through the filtering member 4 to be reversely penetrated into the liquid in the inner chamber 2 that is being decomposed. As a result, the decomposition is enhanced. Usually, the kitchen refuse can be completely liquidized in about 24 hours.

After the liquidized substances have been left and matured in the outer chamber 1, the liquidized substances are taken through the liquidized-substance outlet valve 6. The obtained liquidized substances are returned to the earth or thrown away into a drainage ditch. Since the liquidized substance outlet valve 6 is positioned higher than the filtering member 4 of the inner chamber 2, liquid in a predetermined quantity is always left in the inner chamber 2 even after the liquidized substances have been taken. Therefore, microorganisms are included in the residual liquid, and therefore the apparatus can be used continuously by simply adding kitchen refuse.

The ceramic coating of the outer chamber 1 and the cover 8 of the outer chamber will enable the following effects to be obtained. Since far infrared radiation (5 to 10 microns) have characteristics interrupting the heat conduction, the inner and outer surfaces of the outer chamber 1 are brought to a state where the heat conduction is interrupted through the foregoing two surfaces due to the scientific characteristics of the far infrared radiation. Therefore, the portion of the outer chamber 1 can easily be maintained at a predetermined temperature regardless of the room temperature.

The number of rotations and the rotational speed of the Grinding blade 16 can be adjusted by controlling the number of rotations and the rotational speed of the motor 18 by the program timer 20. The foregoing factors are adjusted adequately depending upon the type and quantity of the kitchen refuse.

The microorganisms and enzymes for use in the apparatus may be any one of a variety of microorganisms and enzymes. For example, aerobic or facultative aerobic bacteria, such as bacillus (*bacillus subtilis*) or phototrophic bacteria, or enzymes originated from the foregoing microorganisms are mainly used.

Since the foregoing bacteria are present in air, use of the apparatus according to the present invention enables the liquefaction process to be performed without the necessity of positively injecting microorganisms.

An example of a second embodiment has an arrangement in which a disposer is connected to the apparatus for liquidizing organic substances according to the first embodiment.

Figure 4:
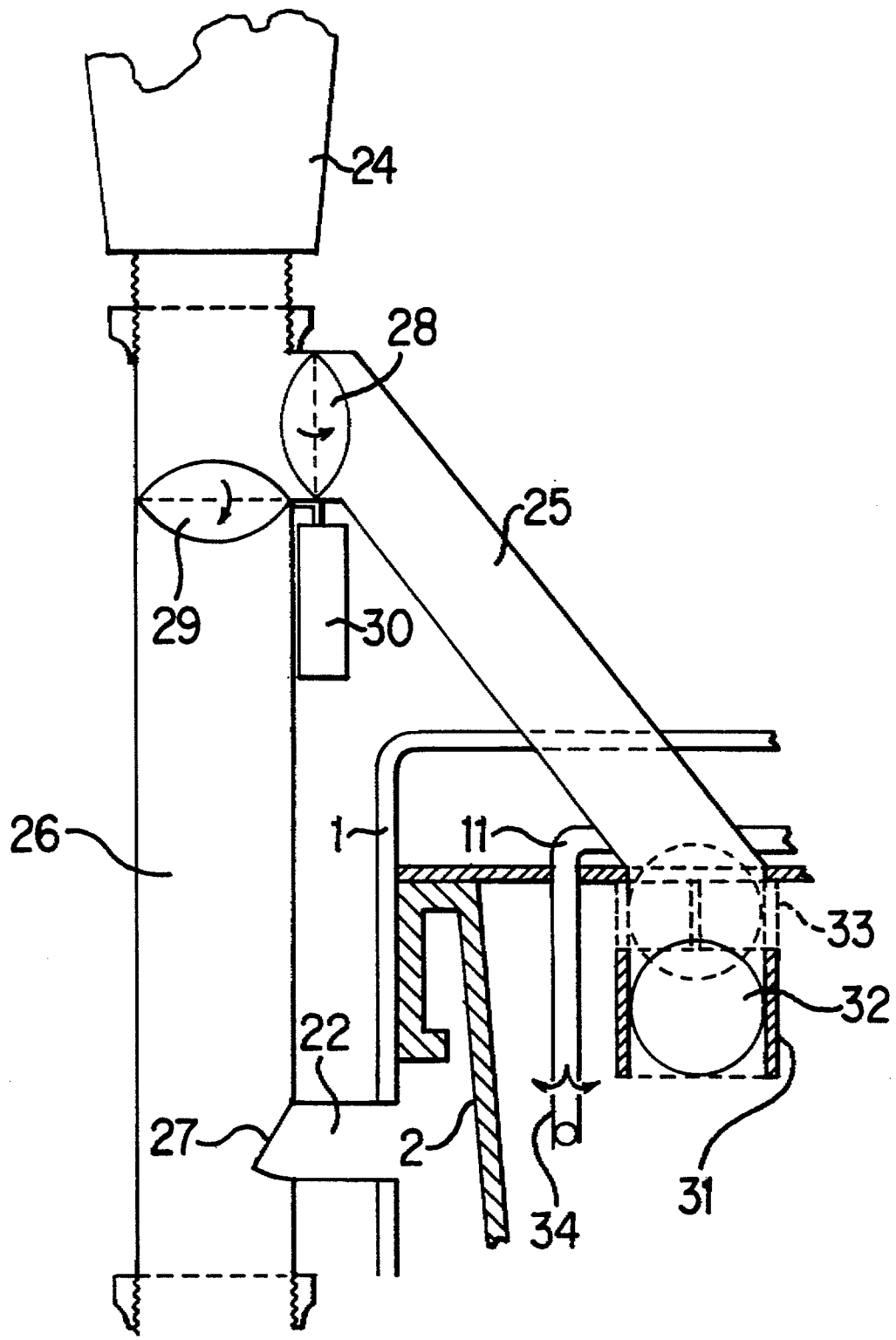
FIG. 4 is an explanatory view which illustrates a case where the apparatus for liquidizing organic substances shown in FIG. 1 is used while being connected to a disposer.
Figure 5:
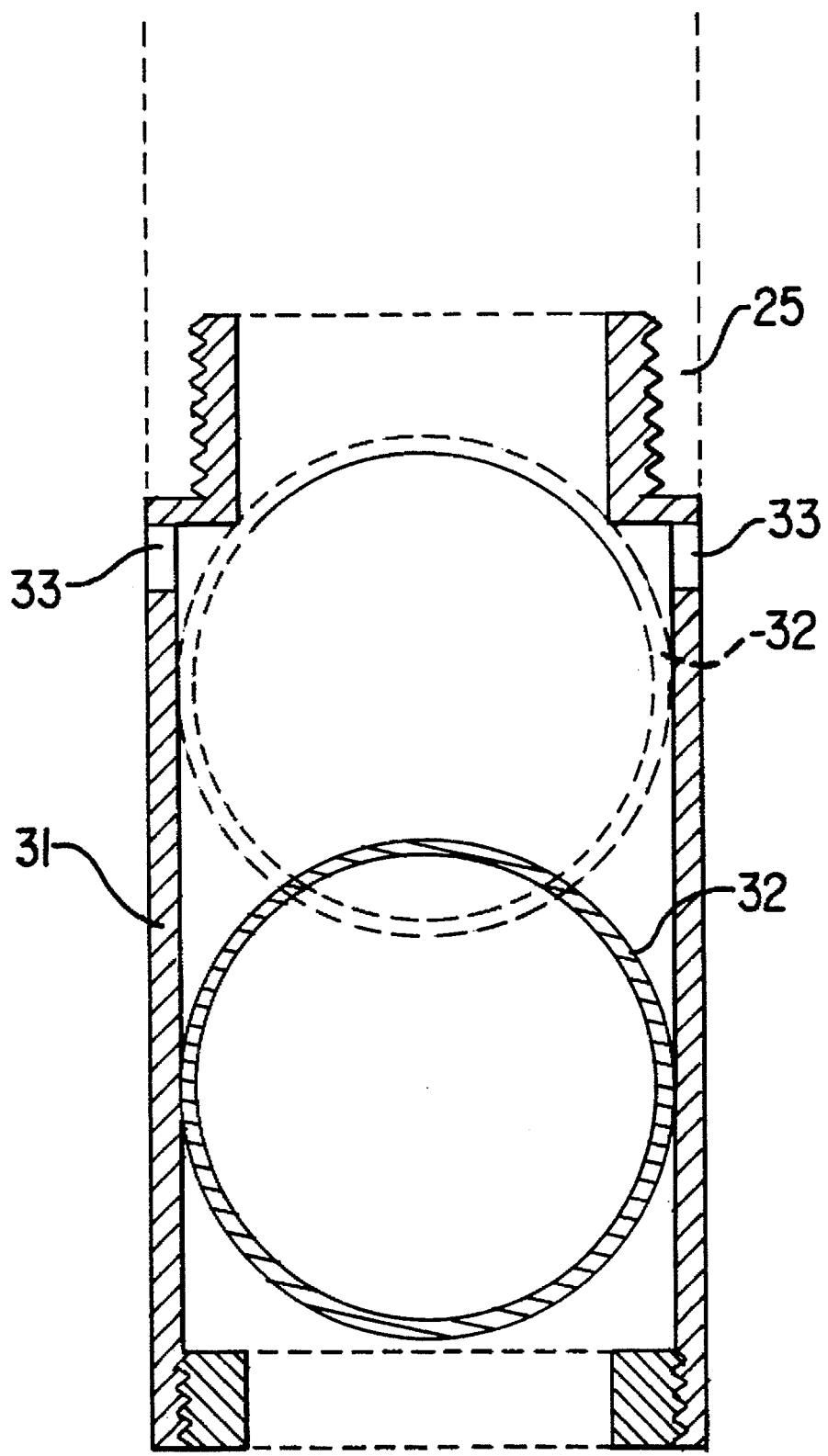
FIG. 5 is a partially-enlarged cross sectional view which illustrates a state of the safety valve shown in FIG. 4.

A description will now be made with reference to FIGS. 4 and 5.

Since the basic structure of this embodiment is the same as that of the first embodiment, only the different structures will now be described. Reference numeral 24 represents a disposer connected to a sink of a kitchen or the like. Reference numeral 25 represents a connection pipe that establishes the connection between the disposer 24 and the inner chamber 2. Reference numeral 26 represents a drain pipe for directly discharging drain from the disposer 24 to the outside of the apparatus. An overflow pipe 22 also serving as the air remover is connected to the drain pipe 26, the overflow pipe 22 also serving as the air remover having, in the leading portion thereof, a sealing valve 27 that is opened/closed by the deadweight thereof.

Reference numerals 28 and 29 represent valves for switching the discharge port of the disposer 24. The valve 28 is disposed between the disposer 24 and the connection pipe 25, while the valve 29 is disposed between the disposer 24 and the drain pipe 26. The two valves 28 and 29 are operated in synchronization with each other. When either valve is opened by a motor 30, the other valve is closed.

Reference numeral 31 represents a check valve provided in the portion in which the connection pipe 25 is connected to the inner chamber 2, the check valve 31 being provided to prevent a backflow. The check valve 31 includes a ball 32 that is vertically moved, thereby opening/closing an inlet open portion 33 thereof. Another check valve 34 for preventing a backflow is provided in the leading portion of the air supply pipe 11.

Example of Use of the Second Embodiment

Since the basic method of use is similar to that of the first embodiment, only characteristic portions will now be described.

Similarly to the first embodiment, water and microorganisms are previously deposited in the inner chamber 2 in certain quantities. Kitchen refuse is ground by the disposer 24, and is passed through the connection pipe 25 before it is passed to the inner chamber 2 through the inlet open portion 33 of the check valve 31. In the case where the kitchen refuse or the like is ground by the disposer 24, the kitchen refuse is discharged from the disposer while containing a large quantity of water. Therefore, the necessity of previously injecting water into the inner chamber 2 can be eliminated depending on the situation.

The kitchen refuse or the like liquidized (fermented, decomposed and digested) in the inner chamber 2 is dissolved in the liquid in the outer chamber similarly to the first embodiment. As a result of the supply of the kitchen refuse or the like into the inner chamber 2 one after another, the water level of the liquid in the outer chamber 1 is also raised. The liquidized substances in the outer chamber 1 are, one after another, discharged into the drain pipe 26 from the overflowing pipe 22 also serving as the air remover.

The overflowing pipe 22 also serving as the air remover is usually closed because the sealing valve 27, which is opened/closed due to the deadweight thereof, is disposed at the leading portion thereof. Only when the liquidized substances are discharged, the overflowing pipe 22 also serving as the air remover is opened due to the pressure of the liquidized substances. Therefore, backflow of water from the drain pipe 26 into the outer chamber 1 is prevented, and also leakage of smell from the outer chamber 1 is prevented.

In a case where substances, such as kitchen refuse or the like, that must be processed, are discharged from the disposer 24, the motor 30 is operated to open the valve 38 and to close the valve 29. Thus, the kitchen refuse discharged from the disposer 24 is directed to the connection pipe 25. Although opening/closing of the valves 28 and 29 by means of the motor 30 may be performed by manually turning on the rotation of the motor 30, the fluid pressure from the disposer 24 may be detected to identify that the discharged substances are kitchen refuse or water so that the motor 30 is automatically rotated.

As a result, the kitchen refuse or the like from the disposer can be automatically liquidizing-processed.

Figure 6:
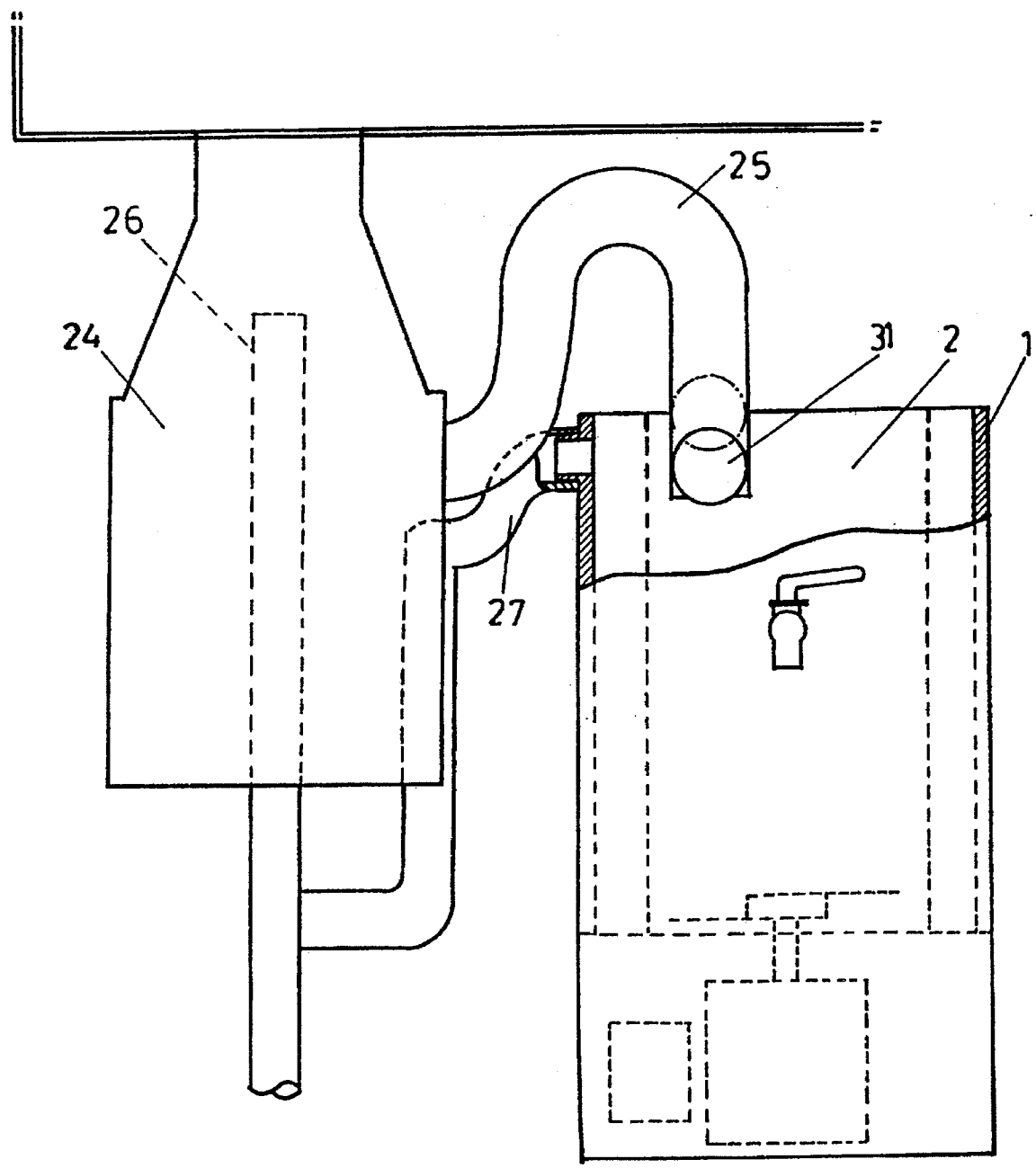
FIG. 6 is an explanatory view which illustrates another example of a method of connecting the disposer to the apparatus for liquidizing organic substances shown in FIG. 1.

Note that an inlet port of the drain pipe 26 is formed in the disposer 24 as shown in FIG. 6. An end of the connection pipe 25 that establishes the connection between the disposer 24 and the inner chamber 2 may be connected to the side surface of the disposer 24 and it may be bent into an inverted U-shape such that its top end is higher than the inlet port of the drain pipe 26, while connecting another end of the same to the check valve 31 of the inner chamber 2. As a result, usual drain does not flow in the connection pipe 25 but usual drain flows through the drain pipe 26 and directly flows in a drainage ditch. In the case where the disposer 24 is operated, the ground kitchen refuse is, by the fluid pressure generated due to rotation of the disposer 24, passed through the connection pipe 25 and is introduced into the inner chamber 2. Thus, a switching mechanism consisting of the valves 28 and 29 can be omitted from the structure.

An example of a Third Embodiment includes a liquidizing chamber and a maturing chamber disposed adjacently on either side of a filtering member, a liquidized-substance outlet valve is provided for the maturing chamber, the liquidizing chamber is insulated from outer air and an air supply apparatus is provided for the liquidizing chamber. In another example, a grinding apparatus is provided at the inlet port of the liquidizing chamber and this will now be described with reference to FIG. 7.

A liquidizing chamber 35 and a maturing chamber 36 are, through a filtering member 37, disposed adjacently in the vertical direction in such a manner that the liquidizing chamber 35 is disposed at a relatively lower position. The liquidizing chamber 35 corresponds to the inner chamber 2 according to the first embodiment, while the maturing chamber 36 corresponding to the space between the outer chamber 1 and the inner chamber 2. The filtering member 37 is formed by using a punching metal having through holes having an adequate size.

In the central portion of the upper portion of the liquidizing chamber 35, which is the central portion of the maturing chamber 36, a disposer 38 is disposed. A funnel-shape injection port 39 of the disposer 38 serves as a cover the maturing chamber 36. Furthermore, an adequate exhaust port (corresponding to the overflowing pipe 22 also serving as the air remover shown in FIG. 1), which is not shown, is formed at an arbitrary position near the top end of the maturing chamber 36. On the other hand, a discharge port 40 of the disposer 38 is formed in the liquidizing chamber 35, the discharge port 40 being surrounded by a stainless-steel net 41. Reference numeral 42 represents a motor for rotating a grinding blade of the disposer.

Reference numeral 43 represents a liquid outlet valve disposed on the side surface of the maturing chamber 36. Reference numeral 44 represents a drain outlet valve connected to the lower portion of the liquidizing chamber 35.

Reference numeral 45 represents a ventilating pipe disposed in the lower portion of the liquidizing chamber 35 and having a multiplicity of aerating and heating nozzles, the ventilating pipe 45 being connected to an air supply fan 46. Reference numeral 47 represents a heater for heating air that is introduced by the air supply fan 46.

The positional relationship between the liquidizing chamber 35 and the maturing chamber 36 is not limited to the foregoing relationship. For example, the maturing chamber 36 (corresponding to the space between the inner chamber 1 and the outer chamber 2) may be disposed around the liquidizing chamber 35 (corresponding to the inner chamber 1 shown in FIG. 1). The liquidizing chamber 35 may be disposed at a relatively higher position and the maturing chamber 36 may be disposed at a relatively lower position. As an alternative to this, the liquidizing chamber 35 and the maturing chamber 36 may be disposed adjacently in the horizontal direction.

Figure 2A:
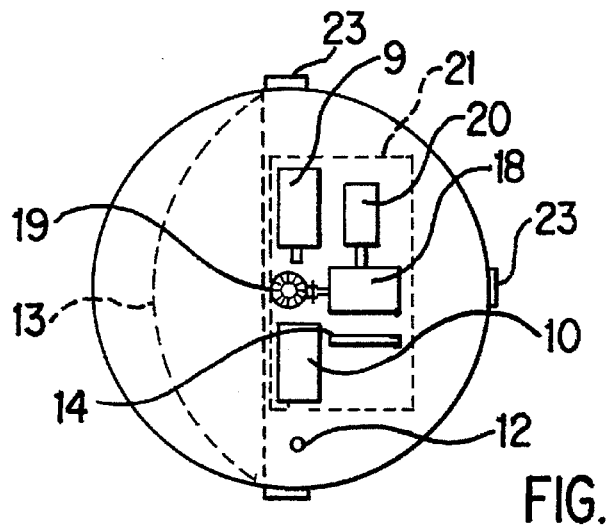
FIG. 2 illustrates an essential portion of the inner chamber shown in FIG. 1, in which (A) is a plan view, (B) is a front cross sectional view and (C) is a bottom view.
Figure 2B:
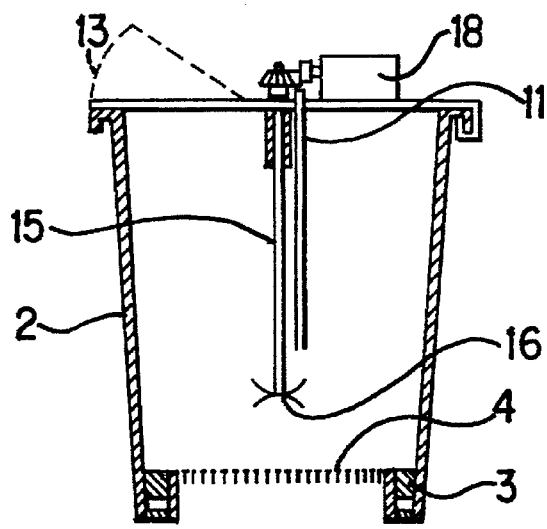
Figure 2C:
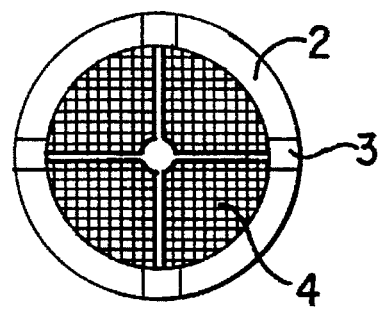
Figure 3:
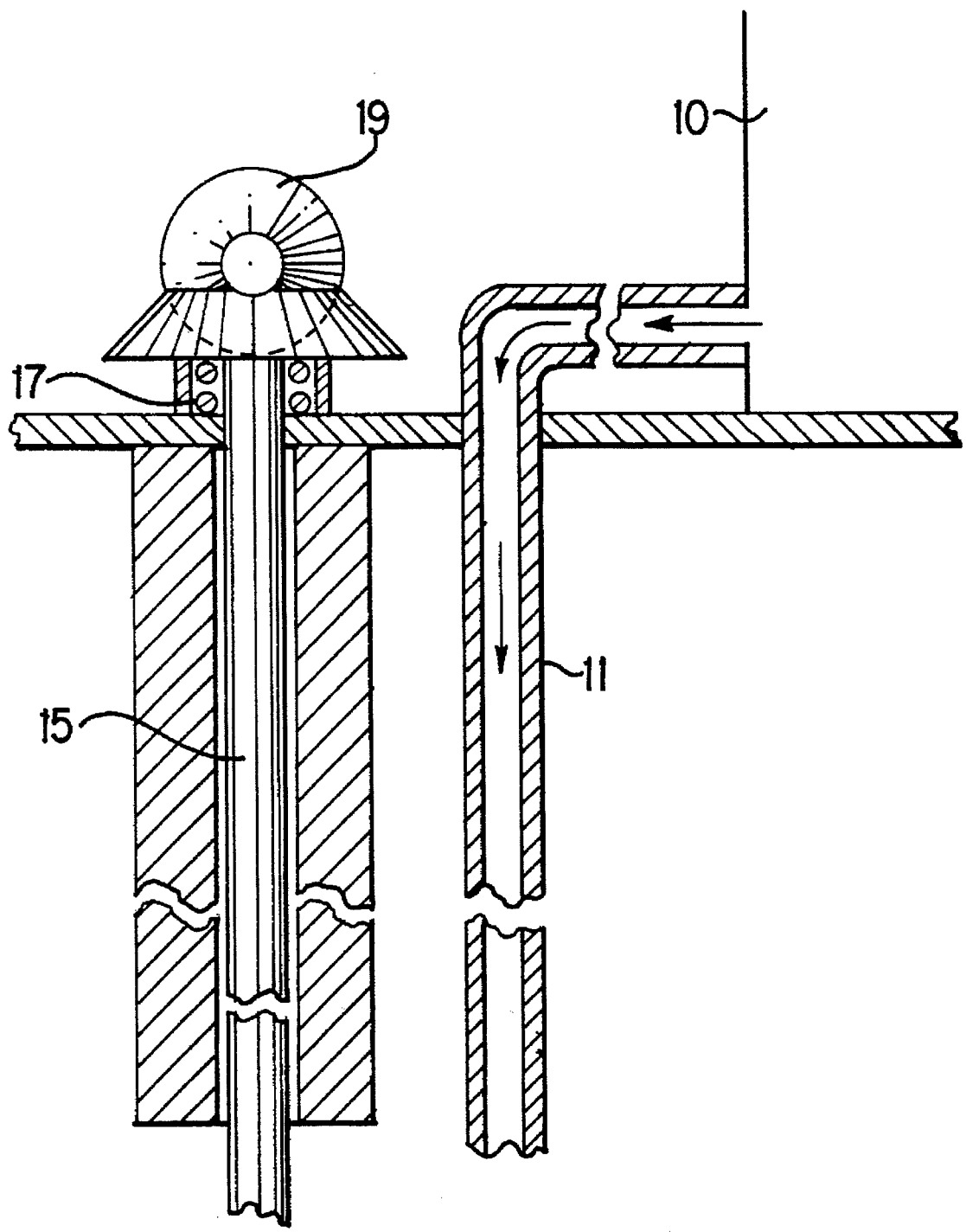
FIG. 3 is a partially enlarged view which illustrates a structure in which a ventilating pipe is provided for the structure shown in FIG. 2 (B)

Although the disposer 38 is disposed in the inlet port of the liquidizing chamber 35 to prevent direct exposure of the liquidizing chamber to the outer air, the opening/closing cover 7 may be disposed at the injection port 13 of the inner chamber 1 (corresponding to the liquidizing chamber 35) as shown in FIGS. 1 and 2.

Example of Use of the Third Embodiment

The basic function of this embodiment is similar to that of the second embodiment.

Kitchen refuse injected into the disposer 38 through the injection port 39 is ground by the grinding blade rotated by the motor 42, is passed through the discharge port 40 and is injected into the liquidizing chamber 35. When new kitchen refuse is injected into the liquidizing chamber 35 from the disposer 38, the water level in the maturing chamber 36 is raised, causing air accumulated in the upper portion of the maturing chamber 36 is discharged outwardly through the exhaust port at the top end of the maturing chamber 36. By using the ventilating fan 46 and the heater 47, the portion in the liquidizing chamber 35 is aerated and heated.

Excess air is discharged through the exhaust port at the top end of the maturing chamber 36. The ventilating fan 46 is able to aerate the portion in the liquidizing chamber 35. Therefore, aerobic fermentation is performed in the liquidizing chamber 35. Note that air accumulated in the top portion of the maturing chamber 36 is discharged outwardly through the exhaust port. Since the structure has the arrangement such that the liquidizing chamber 35 is not in direct contact with outer air, smell of the liquidizing chamber 35 does not leak to the outside of the apparatus. Air outwardly discharged from the maturing chamber 36 is substantially free from bad smell.

The solute of the kitchen refuse liquidized in the liquidizing chamber 35 is dissolved in the liquid, is passed through the filtering member 37 so that it is transported together with the liquid into the maturing chamber 36. Whenever kitchen refuse or the like is newly injected, the water level in the maturing chamber 36 is raised. Therefore, liquidized substances in the maturing chamber 36 are adequately taken through the outlet valve 43 so that the maturing chamber 36 is not fully filled. Thus, the water level is adjusted. The sold materials accumulated in the lower portion in the liquidizing chamber 35 are adequately discharged by opening the drain outlet valve 44. [Fourth Embodiment] An example in which one container is divided into a liquidizing chamber and a maturing chamber.

Figure 7:
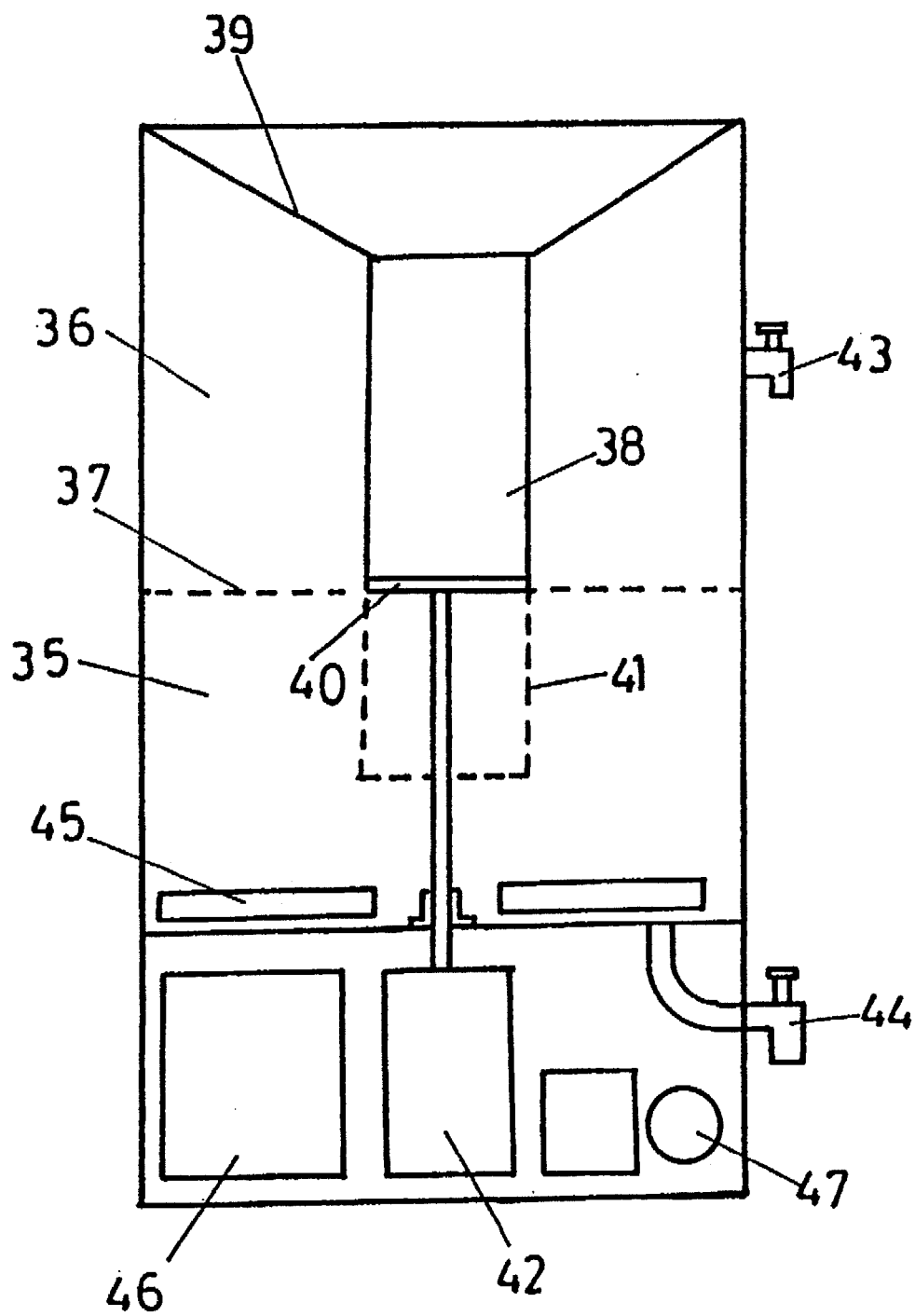
FIG. 7 is a cross sectional explanatory view which illustrates an apparatus for liquidizing organic substances in which a liquidizing chamber and a maturing chamber are disposed adjacently through a filtering member.
Figure 8:
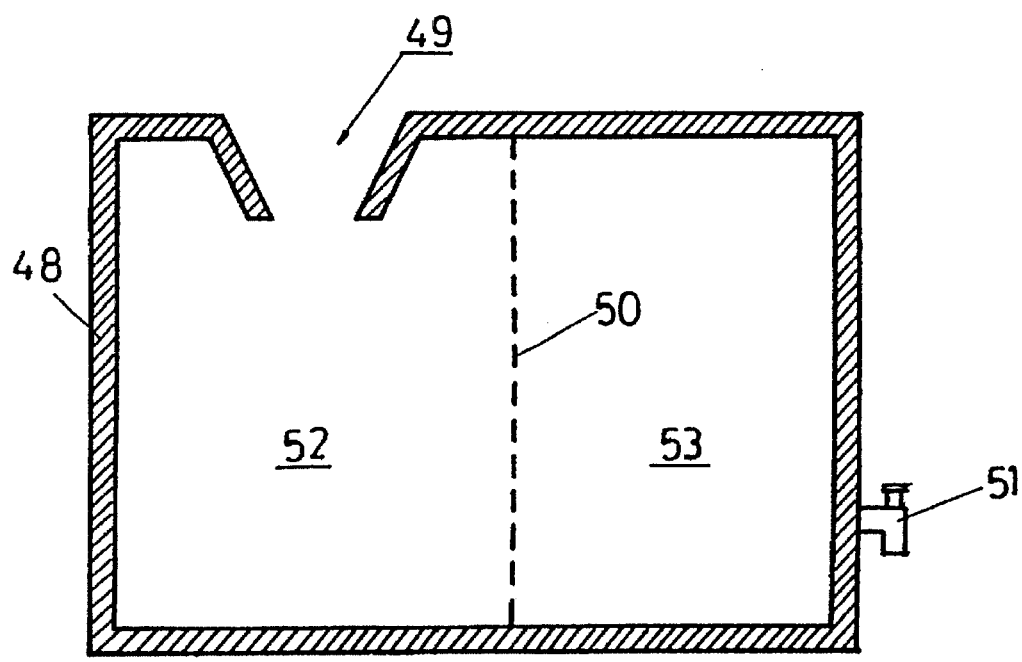
FIGS. 8 and 9 are cross sectional views each of which illustrate an apparatus for liquidizing organic substances comprising one container that is divided into two chambers by a water permeable partition member.

This embodiment will now be described with reference to FIGS. 7 and 8.

This embodiment forms the basic structure of the present invention.

Reference numeral 48 represents a container having one injection port 49. The container 48 has a water-permeable partition member 50 so that the container 48 is divided into two chambers. Either of the two chamber that has not the injection port 49 has a liquid outlet valve 51. FIG. 7 illustrates an example in which the chamber is divided in the horizontal direction. FIG. 8 illustrates the chamber which is divided in the vertical direction. The object of the present invention can be achieved by dividing the chamber by the partition member 50 into two sections regardless of the dividing position.

The chamber 52 having the injection port 49 serves as the liquidizing chamber 35 or the inner chamber 2, while another chamber 53 serves as the maturing chamber 36 or the outer chamber 1. Note that the injection port 49 and the liquid outlet valve 51 may be omitted from the structure. The water-permeable partition member 50 may be made of a metal net, punching metal, cloth, unwoven fabric, a penetrable membrane or the like.

Example of Use of Fourth Embodiment

Kitchen refuse or the like is injected into the chamber 52 having the injection port 49. Then, water in an adequate quantity, and selected microorganisms and enzymes are added in required quantities. Thus, the kitchen refuse is decomposed and liquidized due to the functions of the microorganisms and the like. Thus, the solute is dissolved in water. The liquidized substances are passed through the partition member 50 and are also moved to the other chamber 53. Thus, the liquidized substances are matured in the chamber 53 having the liquid outlet valve 51. Then, the matured liquidized substances' are adequately taken through the liquid outlet valve 51.

In a case where the liquid outlet valve 51 is not provided, the upper surface of the container 48 is opened and the liquidized substances is pumped out by an adequate method. With either method, the container 48 is divided into the two chambers 52 and 53 by the partition member 50 so that one chamber is divided into the liquidizing chamber and the maturing chamber. Thus, the liquidized substances are mutually penetrated so that the phase is standardized. Therefore, whenever kitchen refuse or the like is injected into the liquidizing chamber 35, matured liquidized substances can be taken from the maturing chamber. An example of a Fifth Embodiment includes a cage disposed in one container in such a manner that the cage can be introduced/removed.

Figure 9:
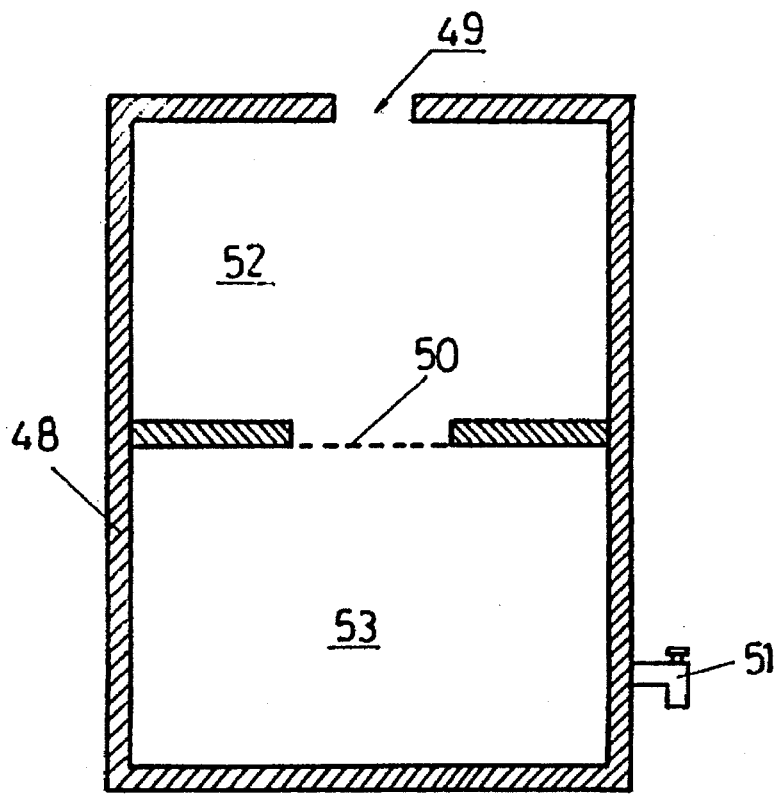
Figure 10:
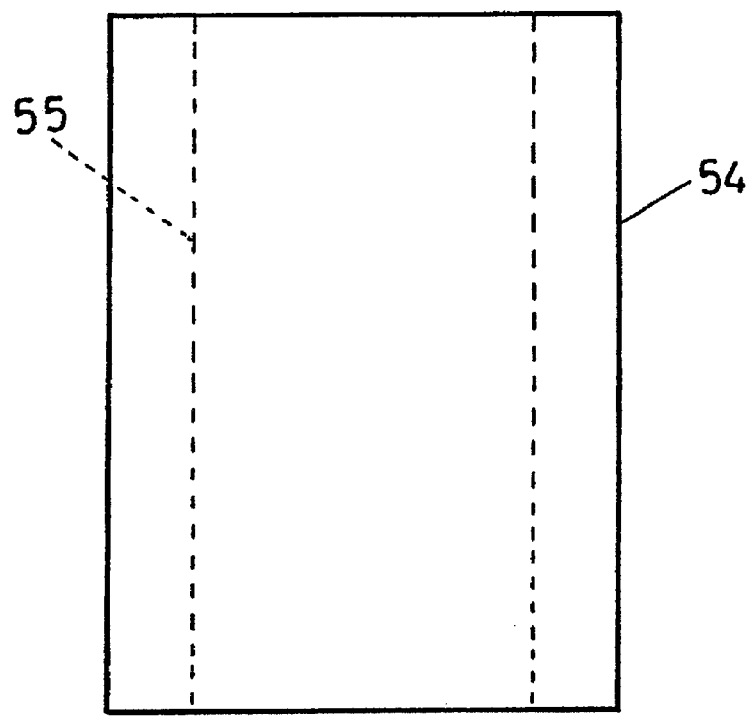
FIG. 10 is a front view which illustrates a state where a cage is disposed in one container.
Figure 11:
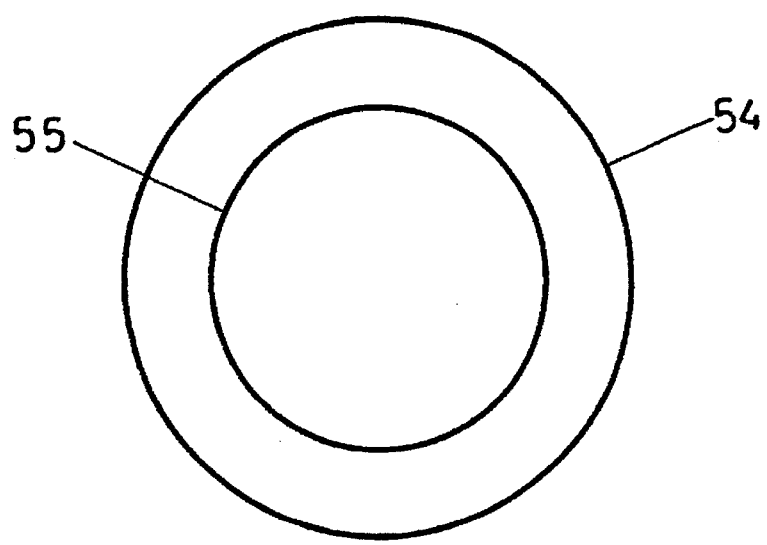
FIG. 11 is a plan view of FIG. 10.

This embodiment will now be described with reference to FIGS. 9 and 10.

Reference numeral 54 represents a cylindrical container having an opened top end. Reference numeral 55 represents a cylindrical metal cage having an opened top end, the cage 55 having a diameter which is smaller than that of the container 54. The cage 54 can be introduced/removed with respect to the container 54.

A cover for sealing the container 54 may be used depending on the situation. A liquid outlet valve may be connected to the container 54. As an alternative to this, the inner and outer surfaces and the like of the container 54 may be applied with ceramic coating.

Example of Use of the Fifth Embodiment

In a state where the cage 55 is accommodated in the container 54, water, microorganisms and the like are injected into the container 54 in adequate quantities similarly to the first embodiment. Then, kitchen refuse or the like is injected into the cage 55. As a result, the solute of the kitchen refuse is, due to the functions of the microorganisms and the like, dissolved (liquidized) in the liquid. The liquidized substances are outwardly moved from the portion in the cage 55, while leaving solid residue in the cage 55. By removing the cage 55 from the container 54, only the liquidized substances are left in the container 54. Therefore, the liquidized substances left in the container 54 is taken by an adequate method. Note that if the liquid outlet valve is connected to the container 54, the liquidized substances can be taken without the necessity of ejecting the cage 55. Therefore, the cage 55 is removed from the container 54 only when the residue in a certain quantity is present in the cage 55 in order to process the residue in the cage 55. Since the residue is left in the cage 55, removal of the cage 55 from the container 54 enables the residue to be processed easily.

Industrial Applicability

As described above, the apparatus for liquidizing organic substances according to the present invention enables the quantity of waste to be reduced easily by injecting kitchen refuse or the like into the container. Since the apparatus can be used repeatedly and continuously, it can be easily used in a usual household. Since the anaerobic state is prevented by using microorganisms in the liquid and as well as the apparatus is basically sealed up, the liquidizing process can be completed in a short time. Furthermore, bad smell can be prevented, thus enabling the apparatus to be used in residential areas in urban regions. In addition, the liquidized substances can be used as liquid fertilizer or the like, and, thus, the source can effectively be used. By further maturing the liquidized substances, the substances can be directly thrown away as completely processed water into a nonindustrial sewage.

What is claimed is:

1. Apparatus for liquefying organic substances comprising a liquefying chamber, inlet means for introducing a solid organic material to be liquefied and for introducing microorganisms into said liquefying chamber, first closure means for closing off said liquefying chamber from the surrounding ambience, aerating means for aerating the material in said closed off liquefying chamber, a maturing chamber juxtaposed to said liquefying chamber, said maturing chamber having impermeable wall means which isolate the material in said liquefying chamber from the material in said maturing chamber, second closure means for closing off said maturing chamber from the outside atmosphere, filtering means between said liquefying chamber and said maturing chamber, said filtering means being operable to diffuse liquefied material as said liquefied material passes from said liquefying chamber through said filter means to said maturing chamber, and outlet means on said maturing chamber for passing said liquefied material from said maturing chamber.

2. Apparatus according to claim 1 wherein said aerating means comprises means for introducing air into said liquefying chamber, and heating means for heating said air which is introduced into said liquefying chamber.

3. Apparatus according to claim 1 further comprising means operable in said liquefying chamber for stirring said material in said liquefying chamber.

4. Apparatus according to claim 1 further comprising ventilating means for ventilating air from said liquefying chamber.

5. Apparatus according to claim 4 wherein said ventilation means comprises a conduit which establishes communication between said liquefying chamber and said maturing chamber.

6. Apparatus according to claim 1 further comprising a ceramic coating on said liquefying chamber, said coating emitting infrared radiation.

7. Apparatus according to claim 1 wherein said liquefying chamber is disposed within said maturing chamber.

8. Apparatus according to claim 1 wherein said liquefying chamber underlies said maturing chamber.

9. Apparatus according to claim 1 wherein said liquefying chamber overlies said maturing chamber.

10. Apparatus for liquefying organic substances comprising an outer container having a side and a bottom, an inner container disposed in said outer container, means on said inner container for introducing a solid organic material to be liquefied and microorganisms into said inner container, said inner container having a side spaced from said side of said outer container to define a side chamber between said inner and outer containers, said side of said inner container being an impermeable wall which isolates the material in said inner chamber from the material in said side chamber, said inner container having a bottom spaced from said bottom of said outer container to define a bottom chamber which is in communication with said side chamber, said bottom of said inner chamber comprising a filter means operable to diffuse the liquefied material in said inner container as said liquefied material passes from said inner container through said filter means to said bottom chamber, said liquefied material passing from said bottom chamber to said side chamber, and outlet means on said outer container for passing said liquefied material from said outer container.

11. Apparatus according to claim 10 wherein said outlet means is disposed at a higher elevation than said filter means.

12. Apparatus according to claim 10 further including aerating means for introducing air into said liquefying chamber and heating means for heating said air which is introduced into said liquefying chamber.

13. Apparatus according to claim 10 further comprising means operable in said liquefying chamber for stirring said material in said liquefying chamber.

14. Apparatus according to claim 10 further comprising ventilating means for ventilating air from said liquefying chamber, said ventilating means comprising a conduit which establishes communication between said liquefying chamber and said maturing chamber.

15. Apparatus according to claim 10 further comprising a ceramic coating on said liquefying chamber, said ceramic coating emitting infrared radiation.

16. Apparatus for treating organic substances comprising a liquefying chamber, inlet means for introducing an organic material and for introducing microorganisms into said liquefying chamber, first closure means for closing off said liquefying chamber from the outside ambience, aerating means for aerating the material in said liquefying chamber, a maturing chamber juxtaposed to said liquefying chamber, second closure means for closing off said maturing chamber from the outside atmosphere, filtering means between said liquefying chamber and said maturing chamber, said filtering means being operable to diffuse liquefied material as said liquefied material passes from said liquefying chamber through said filter means to said maturing chamber, outlet means on said maturing chamber for passing said liquefied material from said maturing chamber, a refuse disposer having outlet means, first conduit means leading from said outlet means of said refuse disposer to a drain, second conduit means leading from said outlet means of said refuse disposer to said inlet means on said liquefying chamber, and diverting means disposed downstream of said outlet means of said refuse disposer and operable to selectively divert the flow of material from said outlet means of said disposer to either said first conduit means or said second conduit means.

17. Apparatus according to claim 16 wherein said diverting means comprises a valve means operable between a first and second position, said valve means when in said first position opening said first conduit means and closing said second conduit means, said valve means when in said second position opening said second conduit means and closing said first conduit means.

18. Apparatus according to claim 16 wherein said drain has an inlet, said diverting means comprising an inverted U-shaped bend in said second conduit means, said inverted U-shaped bend being at a higher elevation than said inlet of said drain.

19. Apparatus according to claim 16 further comprising a chamber outlet means on said liquefying chamber, and third conduit means connecting said chamber outlet means to said drain.

20. Apparatus according to claim 19 further comprising a valve means in said third conduit.

21. Apparatus according to claim 16 further comprising a check valve in said second conduit means to prevent back flow in said second conduit means.

22. A method for liquefying organic substances comprising:

introducing water, microorganisms and an organic substance to be liquefied into a first chamber;

closing off said first chamber from the surrounding ambience;

liquefying said organic material in said closed off first chamber;

providing a second chamber juxtaposed to said first chamber;

closing off said second chamber from the surrounding ambience;

passing the liquefied organic material from said closed off inner chamber through a filter into said closed off second chamber; and withdrawing said liquefied organic material from said second chamber.

23. A method according to claim 22 wherein said step of introducing microorganisms into said first chamber comprises introducing microorganisms selected from the group consisting of aerobic bacteria and facultative bacteria.

24. A method according to claim 22 wherein said step of introducing microorganisms into said first chamber comprises introducing enzymes originated from said microorganisms.

25. A method according to claim 22 wherein said step of liquefying said organic material comprises heating said organic material in said first chamber.

26. A method according to claim 22 wherein said heating step comprises introducing heated hot air into said first chamber.

27. A method according to claim 22 wherein the liquefied organic material passing through said filter is a solute, and further comprising maturing said solute into a liquid fertilizer in said second chamber.

28. A method according to claim 27 further comprising passing said solute in a reverse direction through said filter from said second chamber to said first chamber.

29. A method according to claim 22 wherein said step of withdrawing said liquefied organic material from said second chamber comprises withdrawing said liquefied organic material at a first elevation higher than the elevation of said filter, and continuously maintaining a quantity of liquefied organic material in said second chamber to the level of said first elevation.

30. A method according to claim 22 wherein said organic material is kitchen refuse which includes solid kitchen refuse.

* * * * *